United States Patent [19]

Milewski et al.

[11] Patent Number: 5,930,471
[45] Date of Patent: Jul. 27, 1999

[54] COMMUNICATIONS SYSTEM AND METHOD OF OPERATION FOR ELECTRONIC MESSAGING USING STRUCTURED RESPONSE OBJECTS AND VIRTUAL MAILBOXES

[75] Inventors: Allen E. Milewski, Red Bank; Thomas M. Smith, Plainfield, both of N.J.

[73] Assignee: AT&T Corp, Middletown, N.J.

[21] Appl. No.: 08/773,373

[22] Filed: Dec. 26, 1996

[51] Int. Cl.[6] .................................................. G06F 13/00
[52] U.S. Cl. ............................. 395/200.04; 395/200.12; 395/200.16
[58] Field of Search ................. 380/21, 49; 395/200.36, 395/680, 200.3, 200.38, 200.4, 200.12, 200.16; 364/900, 551

[56] References Cited

U.S. PATENT DOCUMENTS

| | | | |
|---|---|---|---|
| 4,503,499 | 3/1985 | Mason et al. | 364/200 |
| 4,567,600 | 1/1986 | Massey | 380/21 |
| 4,918,588 | 4/1990 | Barrett et al. | 364/200 |
| 5,050,077 | 9/1991 | Vincent | 364/401 |
| 5,089,954 | 2/1992 | Rago | 395/600 |
| 5,093,901 | 3/1992 | Cree et al. | 395/100 |
| 5,129,057 | 7/1992 | Strope et al. | 395/161 |
| 5,161,214 | 11/1992 | Addink et al. | 395/145 |
| 5,165,012 | 11/1992 | Crandall et al. | 395/100 |
| 5,245,532 | 9/1993 | Mourier | 364/400 |
| 5,299,305 | 3/1994 | Oomae et al. | 395/149 |
| 5,325,310 | 6/1994 | Johnson | 395/200.36 |
| 5,333,266 | 7/1994 | Boaz et al. | 395/200 |
| 5,377,354 | 12/1994 | Scannel | 395/673 |
| 5,410,646 | 4/1995 | Tondevold et al. | 395/149 |
| 5,428,784 | 6/1995 | Cahill, Jr. | 395/650 |
| 5,491,626 | 2/1996 | Williams et al. | 364/401 |
| 5,500,938 | 3/1996 | Cahill et al. | 395/161 |
| 5,511,197 | 4/1996 | Hill et al. | 395/700 |
| 5,535,322 | 7/1996 | Hecht | 395/155 |
| 5,555,426 | 9/1996 | Johnson | 395/200.36 |
| 5,632,018 | 5/1997 | Otorii | 395/200.3 |
| 5,647,002 | 7/1997 | Brunson | 380/49 |

FOREIGN PATENT DOCUMENTS

0 739 115 A2   10/1996   European Pat. Off. .

*Primary Examiner*—Parshotam S. Lall
*Assistant Examiner*—Khanh Quang Dinh

[57] ABSTRACT

A communications system facilitates transactions between a sender and a plurality of recipients as part of an electronic messaging system. Messaging means enable a sender to form an electronic template containing a message in the form of a structured response object for a recipient as part of a transaction between a sender and a recipient(s). Controller means receive and store the message in a virtual mailbox assigned to the transaction for access by the sender and the recipient(s). The controller means generate and send to the recipients an indicator or pointer identifying the message at an address for the virtual mailbox. The recipient(s) use the pointer address to view the electronic message in the form of a structured object response at the virtual mailbox in the controller. The recipient may ignore or file the message or send a response to the virtual mailbox. The response or lack of response to the structured object response by the recipient(s) is tracked and recorded by the controller. The status of the transaction is updated as reflected by the structured object response(s) and summarized for display by the controller upon inquiry by the sender. A reminder of a response due to a transaction is sent by the controller to the recipient(s) when selected from the summary display by the sender. When the transaction between the sender and recipient(s) ends, for one reason or another, the electronic message is erased from the virtual mailbox.

28 Claims, 9 Drawing Sheets

COMPOSE AN ACTION MESSAGE

[ <u>I</u>ntroduction  <u>E</u>xamples  <u>S</u>tart Composing  <u>C</u>heck your Action Email ]

Recipients [Use the (appla)key or(control)key to choose more than one recipient]

| dolores_i_andrus | ak01125 |
| carmen_arom | ak011251 |
| robin_j_badders | ak011253 |
| john_baldasare | ak011254 |
| harry_e_blanchard | ak011255 |
| c_douglass_blewett | ak011257 |
| greg_e_blonder | ak011258 |
| robert_a_boie | webreview |
| susan_j_boyce | |
| edward_y_chen | |

200

206  204

Subject: Staffing for Project Xi     208

Question-try to keep the text of your question within this width    Possible responses We need to staff up for the new project. let me know your preference for hiring.

Permanent employees
Contract employees
Other

☑ Provide additional space for freeform reply   214 —⦿ Allow one response
   212                    210           216 —◯ Allow any number
Return address thomas_m_smith/tsmith@research.att.com Send me email | whenever anyone replies |    | send a message |

<u>Q</u>uestions/<u>c</u>omments/<u>s</u>uggestions about Action Email?   218          220

COMMUNICATIONS SYSTEM AND METHOD OF OPERATION FOR ELECTRONIC MESSAGING USING STRUCTURED RESPONSE OBJECTS AND VIRTUAL MAILBOXES

BACKGROUND OF THE INVENTION

1. Field of the Invention

This invention relates to communications systems. More particularly, the invention relates to computer software for a computer controlled electronic messaging system using structured response objects and virtual mailboxes.

2. Description of Prior Art

Electronic messaging (including E-mail and voice mail) has recently experienced a surge in popularity and is now commonly employed by both business people and consumers for a wide variety of tasks. Because electronic messaging systems automate the delivery and storage of information, they simplify the task of communicating and of keeping track of communications. While much of the literature treats messaging as the conveyance of information from one party to one or more other parties, messages are often used as parts of larger, more complicated transactions. For example, a message that invites attendees to a meeting is likely to request a reply indicating the attendee's availability. The sender of that message has not only conveyed the desire for the attendee's attendance, but initiated a transaction that could continue up until the time of the meeting. During that time, the attendee may or may not respond to the initial message. If the attendee does respond, the sender may compile responses from several attendees, decide upon a time and re-respond with a new meeting time, possibly including an additional RSVP. The attendee may change his availability in the meantime, and the process could begin again. If the attendee chooses not to respond to any of the messages, the sender may initiate a reminder. All of these steps are part of the same transaction, and they are all done with messages. But, except for message delivery and storage, the transaction is entirely manual and left to the memory and decisions of the users.

As the popularity of electronic messaging has grown, so has the number of messages sent and received by its users. The number of messages is expected to increase even more in the future. Additionally, messaging systems have promoted free-form communications by its users. Although the message headers may be somewhat standardized and structured, the body of messages has remained unstructured, left entirely up to the sender of the message. Because of the large amount of messages received, there is now substantial attention being paid to methods for increasing the efficiency of processing and organizing messages. One of the methods receiving attention is "structured response objects". Structure response objects include buttons, menus, and formatted fields of other objects that the sender can include in the body of the message, and can trigger a variety of functions when manipulated by the recipient. One common function of these objects is to send a reply of predetermined content back to the sender. Recently a limited number of messaging systems (primarily email) systems has introduced structured object responses to coax the recipient responses into a predetermined organization. For example, both Lotus Notes Mail™ and MicroSoft Exchange™ let the sender insert button and other response objects. Structured response objects have several advantages. First they can reduce the amount of time and effort spent by the recipient while responding to the message. Secondly, structured responses can enforce more consistency in the reply content, which can help the sender and recipient to organize, filter and potentially perform processing automatically on replies.

Electronic messaging systems can be further enhanced using a "virtual mailbox" in which the content of messages is maintained on a central server while a "personalized pointer" is actually transmitted to a user's station. For electronic mail, the pointer consists of a Uniform Resource Locator which when invoked by the user displays the content of the message. For voicemail, the pointer could consist of an electronic bridge to a virtual mailbox controller, and thus be invisible to the user. Personalizing the pointer and message to the recipient is an improvement over current practice of mailing a URL, not the message, to a recipient for review. Maintaining the message content on a server, rather than sending it to the user's station has a number of advantages. One advantage is that much of the actual processing in a response processing, content modification and status management can be done on a single machine. Another advantage is the server makes the messaging system platform independent.

Prior art related to electronic messaging is as follows:

U.S. Pat. No. 4,918,588 issued Apr. 17, 1990, discloses an office automation system which provides electronic access to images of documents by a plurality of users. An image access subsystem provides office automation applications access to images stored in a variety of storage mediums such as microfilm, microfiche, optical disks and the like. The access system uses a hardware controller to handle the complexity of retrieval of images from image storage devices. A relational data base system organizes the stored images to provide flexible access to the images and isolate any effects of reconfiguration of the image storage system.

U.S. Pat. No. 5,050,077 issued Sep. 17, 1991, discloses a method of scheduling meetings which permits an operator to select desired times, dates, and attendees and automatically determine appropriate meeting times despite the non-availability of a meeting time which complies with all of the operator's requirements. A prompting screen is provided to a meeting scheduler with blanks for keying in desired times, dates, and prospective attendees for the meeting. The attendees' key in to this screen and a comparison is made with the calendar of events for each attendee. As a result of the non-availability of a meeting time, which complies with the desired dates, times and attendees, these factors are "relaxed" to achieve an acceptable meeting time. An option list of meeting times is then presented to the scheduler for selection of a meeting time. Based upon the selection of the scheduler, a meeting notification screen is constructed for transmittal to the attendees.

U.S. Pat. No. 5,165,012 issued Nov. 17, 1992, discloses a software package that allows a user to store a current screen display for recall at a later time or to add additional textual annotation to a current screen display and store the annotated screen for recall at a later time. A reminder message can be saved without exiting or ending the currently executing process. The display can be text, electronic mail messages, graphics, screen displays, single screen displays, or multiple screen displays. Certain types of reminders are automatically updated when the data from which they were created is updated so that the most current version is always displayed.

U.S. Pat. No. 5,491,626 issued Feb. 13, 1996, and filed Jun. 16, 1993, discloses a computer system for scheduling an event when the event has required definitional information such as a distribution list, number of attendees, list of supplies, hardware, etc. The required information is stored on the computer system and associated with a graphical object which may be dragged and dropped on to an event schedule for appropriate searching of facilities that match the required meeting needs.

U.S. Pat. No. 5,511,197 issued Apr. 23, 1996, and filed Nov. 13, 1992, discloses a method and system for passing pointers to objects as parameters in a remote procedural call in a computer network environment. A service process passes to a client process a pointer to an interface of an object. The server marshals a pointer to the interface and sends the marshalled pointer to the client. The client process unmarshalls the pointer and accesses the passed object using the unmarshalled pointer. The marshalling and unmarshalling techniques load code and generate data structures to support the accessing of the object by the client.

U.S. Pat. No. 5,333,266 issued Jul. 26, 1994 discloses a multimedia messaging system in which message information processed and stored by any of a plurality of interconnected electronic mail systems can be accessed from any system. The messaging system comprises a plurality of file servers each coupled to a plurality of work stations. Each file server includes a message store as well as a message pointer store. The message pointer store includes message pointers for all messages to system users regardless of media type.

U.S. Pat. No. 5,500,938 issued Mar. 19, 1996, and filed Mar. 7, 1994, discloses computer software for signaling a user through a changing cursor and directly specifying the start and stop times for meetings scheduled on an electronic calendar. The computer system includes a pointing device such as, for example, a mouse. A user positions a pointer in a predesignated time selection area of a calendar displayed in a computer monitor using a pointing device. A desired start time is selected along a time line of the electronic calendar by activating the pointer device. New user-oriented instructions are then automatically displayed on the pointer. The pointer is then placed at a desired stop time. Again, the user selects the time by activating the pointer.

None of the prior art discloses an electronic messaging system using structured response objects and virtual mailboxes which keep track of and report status of multi-step transactions and provide users an easy way to create transactions or provide for automatic response processing. A system that automates and facilitates every day electronic messaging transactions can act as an enabler to increase the number and complexity of transactions.

SUMMARY OF THE INVENTION

An object of the invention is a communications system and method of operation for conducting improved transactions among system users using structured response objects and virtual mailboxes.

Another object is a communication system which automates processing, tracking, and record keeping in conducting communication transactions among system users.

Another object is a communication system and method of operation which centralizes distribution of messages and responses at a central location or virtual mailbox in conducting a communication transaction among system users.

Another object is a communication system and method of operation which distributes electronic messages in the form of templates for a non-textual and/or textual response by a recipient.

Another object is a communication system and method of operation which uses multiple structured object responses in the form of buttons and menus in an electronic template as a means of responding to a message by a sender.

These and other objects, features and advantages of the invention are achieved in a communications system which facilitates communication transactions between a sender and a plurality of recipients as part of an electronic messaging system. Messaging means enable a sender to form an electronic template containing a message in the form of a structured response object which may require multiple response by the recipient(s) as part of the transaction. Controller means receive and store the structured object response in a virtual mailbox assigned to the transaction for access only by the sender and the recipient(s). The controller means generate and send to the recipients a personalized indicator or pointer identifying the message at an address for the virtual mailbox. The recipient(s) use the personalized pointer to view an electronic message as a part of the structured object response at the virtual mailbox in the controller. The recipient may ignore or file the message or send a response to the virtual mailbox. The response or lack of response to the structured object response by the recipient (s) is tracked and recorded by the controller. The status of the transaction is updated as reflected by the structured object response(s) and summarized for display by the controller upon inquiry by the sender. A reminder of a response due to a transaction is sent by the controller to the recipient(s) when selected from the summary display by the sender. When the transaction between the sender and recipient(s) ends, for one reason or another, the electronic message is erased from the virtual mailbox.

DESCRIPTION OF DRAWING

The invention will be more fully understood from the following detailed description taken in conjunction with the drawing, in which.

DESCRIPTION OF THE PREFERRED EMBODIMENT

As a preliminary to describing the preferred embodiment, it is believed in order to provide some background on electronic messaging commonly referred to as E-mail with respect to (1) electronic messaging as transactions, and (2) structured response objects or action message as replies in a transaction to increase efficiency.

Transactions can be defined as a series of activities between two or more parties that follows through to the completion of some planned goal. Transactions, like messages, involve interaction between people and are often asynchronous. Transactions differ from the traditional messaging paradigm in two ways: First, transactions have temporal continuity. Once initiated, most transactions continue to exist until they are either finished, terminated, or "timed out". While on-going, a transaction always has a definable set of "next" actions, so that the transaction has some state, even when no overt activity is taking place. Second, the potential "end" states of transactions are predefined as are the processes for reaching them. Stated another way, transactions may be viewed in terms of different kinds of control. At the level of individual communications, control in the transaction passes back and forth between participants, but as a whole, the initiator maintains a large degree of control over the transaction by having to decide the potential end states, the initiator has put bounds on the kinds of actions that can take place within the transaction. Accordingly, the present invention is directed to improving the efficiency of communication transactions in a communication system.

As part of increasing transaction efficiency, structured response objects are made available by a sender to a recipient to make more simple and faster for a recipient to respond to a message as part of a transaction. Structured response objects are pre-delineated forms specified by a sender to lower the barrier to a response by the recipient to a message. No programming is required by the recipient to respond to the message, the recipient simply completes the form. In return, the sender can realize increased efficiency through automatic selection and analysis of the structured object responses. Furthermore, automatic reply processing may help decrease the number of reply messages in the sender's mailbox, thus providing a task management advantage for the sender. For purposes of the present invention, structured response objects include buttons, menus, and formatted fields that a message sender can specify in a message to elicit predetermined responses from recipients, again without requiring any programming effort by the recipients. There are several advantages to structured response objects. First, they reduce the amount of time and effort spent by the recipient in responding to a message. In many structured response object replies, the recipient can simply click the mouse and the message is responded to in a meaningful way. Second, because structured responding can enforce more consistency in the reply content, these objects can help the sender and the recipient to organize, filter and potentially perform processing automatically on the replies.

Summarizing, the efficiency of transactions in a communication system is improved using structured response objects as a basis for replying to events. Throughout the description, structured responses may also be classified as an "action message" as more descriptive of the reply sought by a sender.

Figure 1:
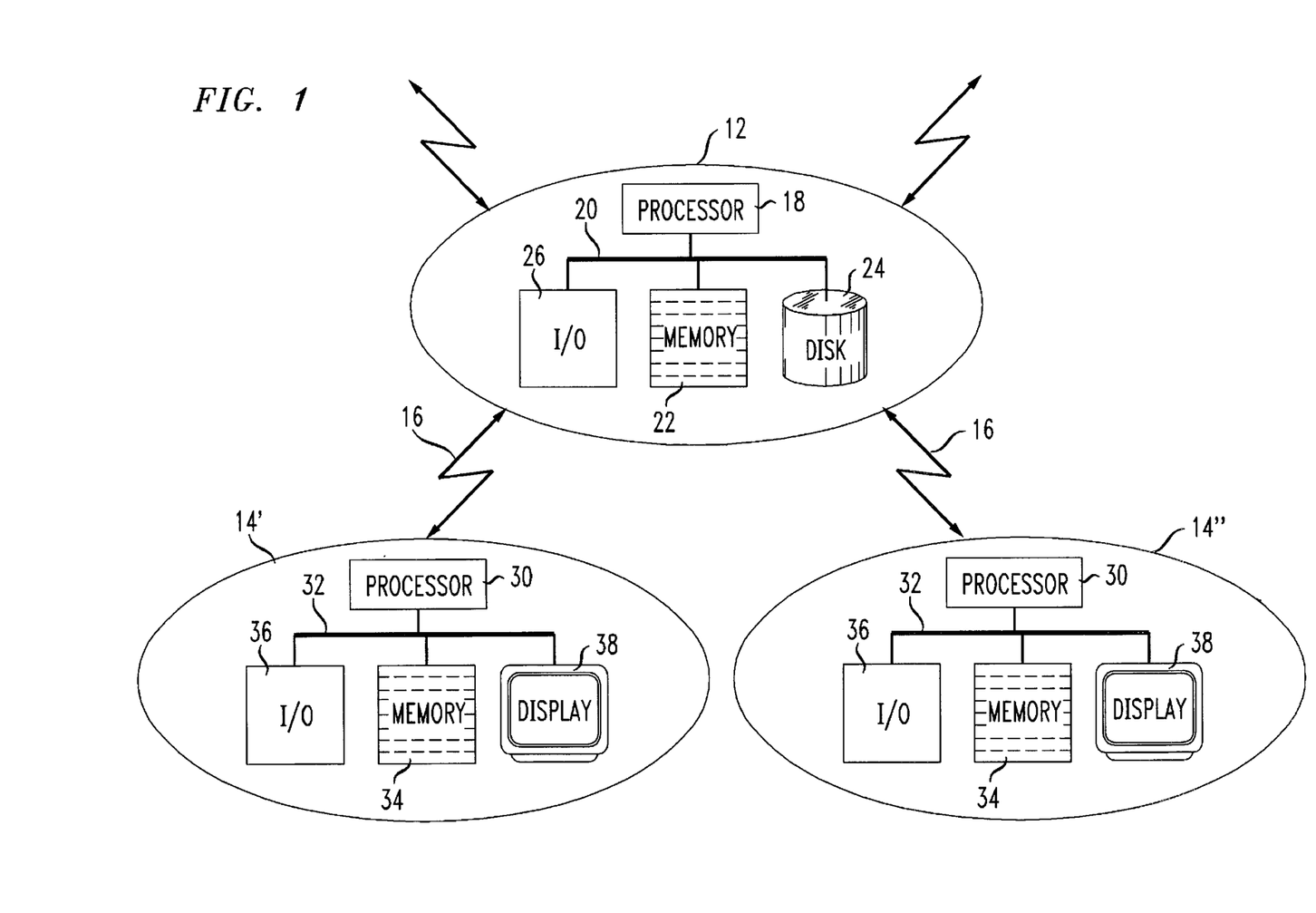
FIG. 1 is a representation of a communication system which facilitates transactions between a sender and at least one recipient and incorporates the principles of the present invention.

Now turning to FIG. 1, a communication system 10 including a communications controller 12 is coupled to a plurality of communications stations 14' . . . 14" through conventional wired line or wireless links 16. The controller 12 includes a processor 18 for managing and controlling electronic messages among the stations 14' . . . 14". In one form, the processor may be a conventional server as a repository and distributor of electronic data as well as a gate-keeper for linking together a sender station 14 with a receiver station 14". Processor 18 is coupled through a system bus 20 to a conventional system memory 22; a magnetic storage DASD (Direct Access Storage Device) 24 which serves as storage for application programs executed by the processor 18, and an interface 26 linking the processor with the station 14' for information transfer purposes. The memory 22 contains stored program instructions for a conventional operating system linking together the units 22, 24 and 26 as a communications controller. The memory 22, from time to time, obtains applications programs in the form of program instructions from the disk 24 to implement communication protocols in exchanging messages among the stations 14'. The details of these stored program instructions will be described hereinafter in connection with the operation of the communications system. Also, the memory 22 and disk 26 store electronic templates of structured object responses prepared by senders at the communications stations 14' as part of a transaction with one or more recipients. The templates, as will be described hereinafter, provide structured response objects to simplify responses by recipients of an electronic message as part of such a transaction. Finally, the memory 22 provides a sender with a virtual mailbox for the structured object responses sent as part of a transaction. A virtual mailbox is a location in memory with an address accessible only by the sender and the recipient(s) of a structured object response for viewing and responding to a message contained in the structured object response. The virtual mailbox is associated with software, to be described hereinafter, for generating and sending pointers to senders and recipients indicating the address of the virtual mailbox in memory for tracking, summarizing, displaying the status of a structured object response by the recipient(s).

Each communication station 14 includes a processor 30 coupled through a system bus 32 to a memory 34; input/output circuits and devices 36 and a display 38. All of the units at the station are conventional. The memory 34 includes stored program instructions for an operating system and application programs for creating electronic messages in structured object form. When these structured response object forms are shown on the display, an operator can modify the form to minimize the response by a recipient. Each memory 34 includes further application programs for responding to an electronic message as will be described hereinafter.

The preferred embodiment includes a plurality of software modules for implementing the electronic messaging system of the present invention. The software modules reside at the communications stations and at the communications controller, as will be described hereinafter.

Figure 2:
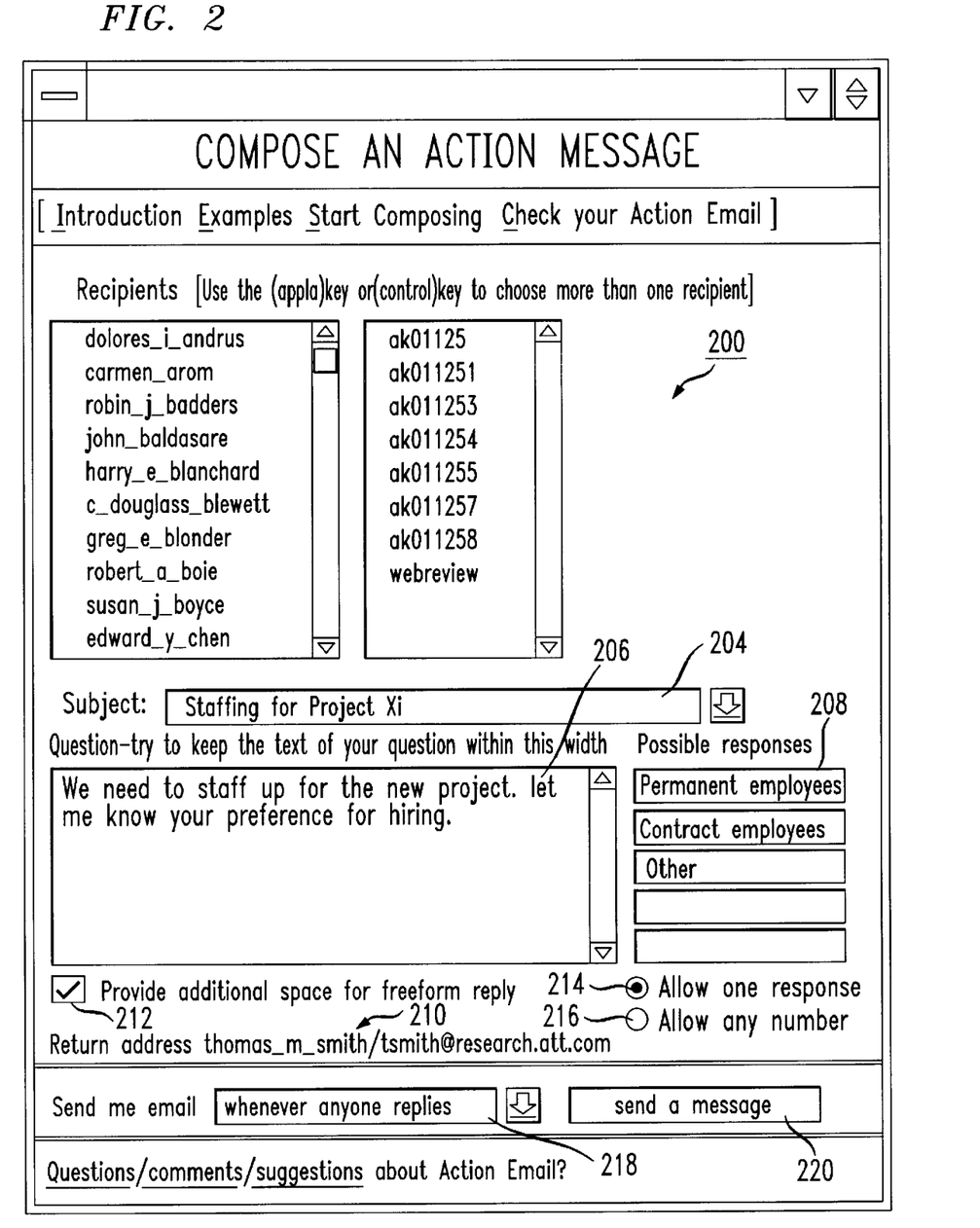
FIG. 2 is a representation of an electronic template for forming and sending a structured response object or action message to a recipient in the system of FIG. 1.

FIG. 2 is a screen display of an electronic template 200 at a communications station. The template enables a sender to compose a structured response object or action message to a recipient at another communications station 14. The template can be formed and stored at the station 14 using a conventional authoring tool. The electronic template 200 includes several fields for supplying information by either the sender or a recipient. A field 202 provides space for the sender to enter the names of the addressees and their electronic addresses. A field 204 provides space for the sender to type in the subject of the message. Field 206 provides space for the sender to enter a question to the recipients. Field 208 provides space for the sender to specify a menu of responses available to the recipients. The template 200 further includes an additional field 210 to provide space for free-form reply by a recipient provided the sender activates the field by marking a box 212 adjacent to the field.

The template also includes marks or bullets 214 and 216 which indicates the number of responses sought by the sender. By selecting the bullets using a pointing device, e.g. cursor or mouse, the sender may allow a single response or any number of responses. The template concludes with the return address of the sender and fields 218 and 220 which instruct the communication controller to send E-mail according to the sender's desires. In this instance, the sender has completed field 218 indicating an electronic message should be forwarded to the sender whenever anyone replies. Once completed by the sender, the template 200 is forwarded to the communications controller 12 (see FIG. 1) for handling.

The completed template containing an action message in the form of a structured object response as part of a transaction is stored in a virtual mailbox at an address located in memory 22 or the DASD device 24. In response to the stored template, the controller initiates a "personalized pointer message" to each recipient named in the action message in lieu of the message stored at the virtual mailbox address.

Figure 3:
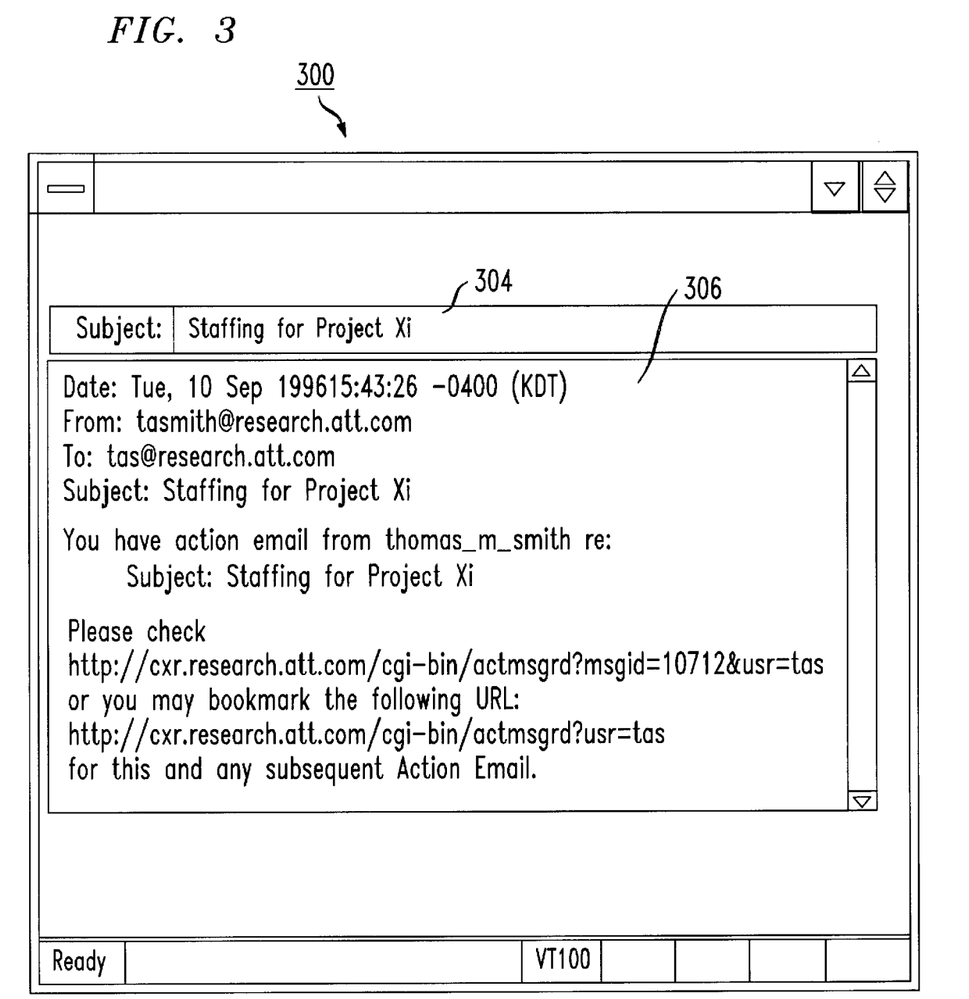
FIG. 3 is a representation of an electronic pointer message to a recipient referring the recipient back to a controller in the system of FIG. 1 which maintains the current state of the action message in FIG. 2.

FIG. 3 discloses a screen representative of a pointer message 300 to each recipient listed in the message. The screen includes a first field 304 for entering the subject of the meeting which the controller strips from the screen 200. A field 306 is completed by the controller from data contained in screen 200. This data includes the date of the message, sender of the message, addressee or recipient of the message, and the subject. The controller provides a notice to the recipient of the message and instruction to respond to the message stored at the controller. While personalized pointers have been described in terms of electronic messages, a personalized pointer may also include an 800 number to call with a personal identification number (PIN) as a response to the structured object response or action message.

Figure 4:
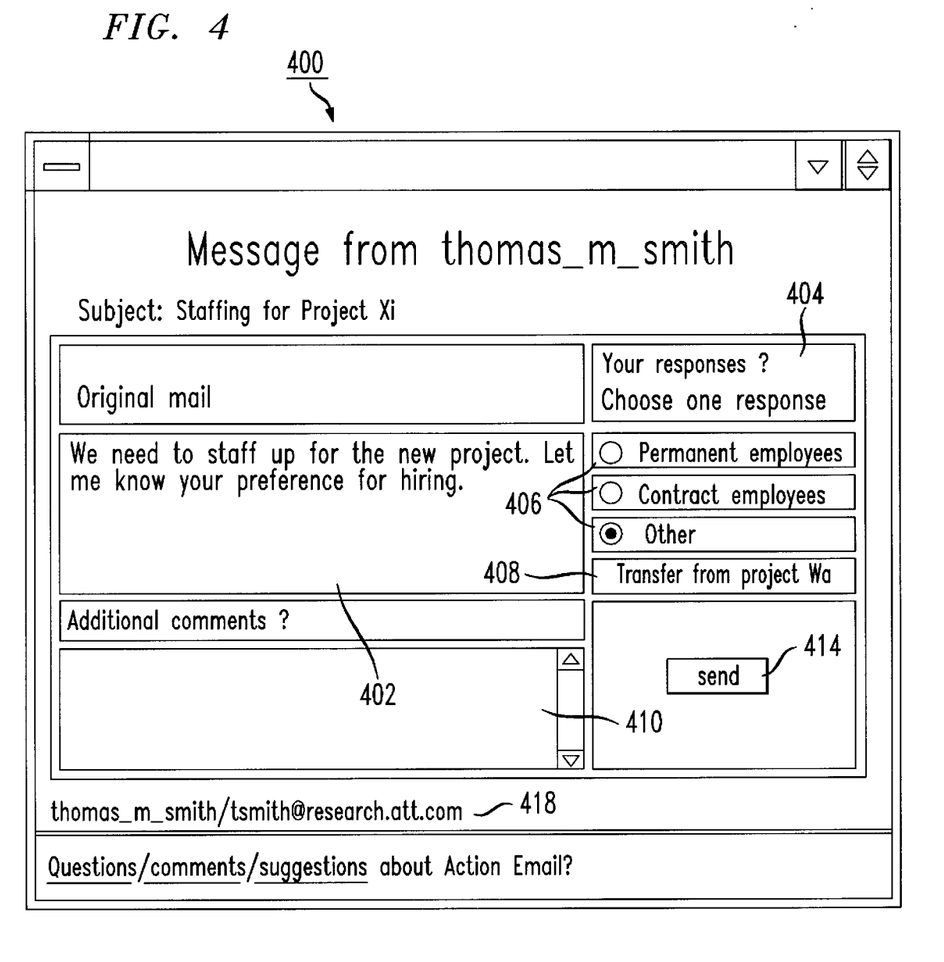
FIG. 4 is a representation of a response provided by a recipient to the structured object response of FIG. 2.

In responding to a reply pointer message, the controller transmits a portion of the original message contained in the template 200. FIG. 4 is a screen of the action message 400 displayed by the controller at the recipient's station. The message 400 includes a field 402 which includes the text displayed in field 206. Field 404 is based upon the sender marking the bullet 214 in the template 200 (see FIG. 2). A field 406 corresponds to the menu of responses listed in field 208 of template 200. Upon marking the selected response, the recipient completes the response to the action message. In the present instance, the recipient has marked the "other" response and provides text in a field 408 as a response to the text in field 402. A field 410 is available for additional comments which the sender authorized to be entered by checking the field 212 in template 200. In this case, the recipient has chosen not to provide any additional comments. The addressee of the response message is contained in a field 412 and a message is transmitted by the recipient actuating a send button 14 by controlling a mouse to position a cursor over the button and clicking a button on the mouse or by a touch screen display device which allows a user to physically touch the desired send button or by using a keyboard to position the cursor over the send button.

Figure 5:
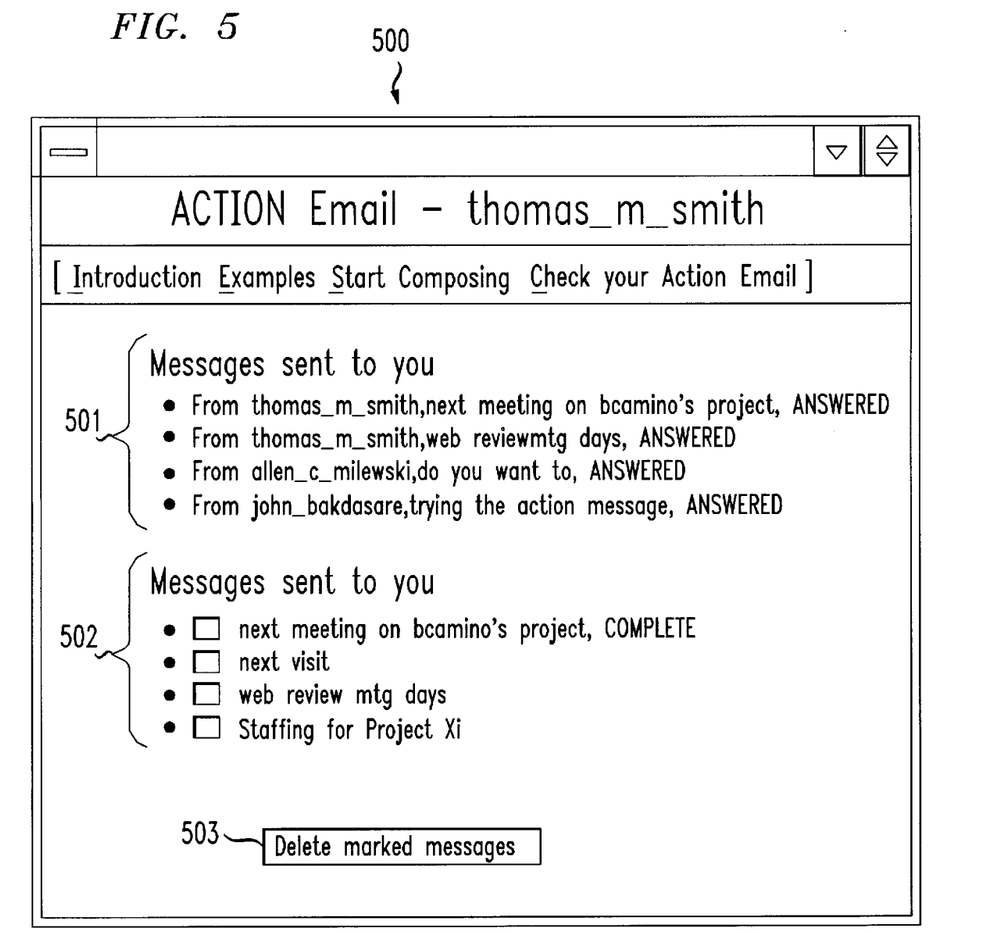
FIG. 5 is a representation of an electronic message containing the status of messages sent to and sent by the sender of FIG. 1.

FIG. 5 is a screen of a status template 500 provided by the controller to the sender indicating the status of messages sent and received by the sender as contained in the virtual mailbox at the controller. A field 501 contains a list of messages sent to the sender together with a topic and status of the message. Field 501 indicates four messages have been received by the sender. The first message indicates the sender, subject and whether or not a response has been made to the message. In those instances where the message has not been answered, a notation would be made "not answered" for such a message. A field 502 is a list of messages sent by the sender by subject and completion status. Only the first message is indicated as being completed responded to by the recipient. A field 503 provides instructions from the controller to the recipient to delete messages from the field 502 when the message is complete, as is the case for the first message.

Figure 6:
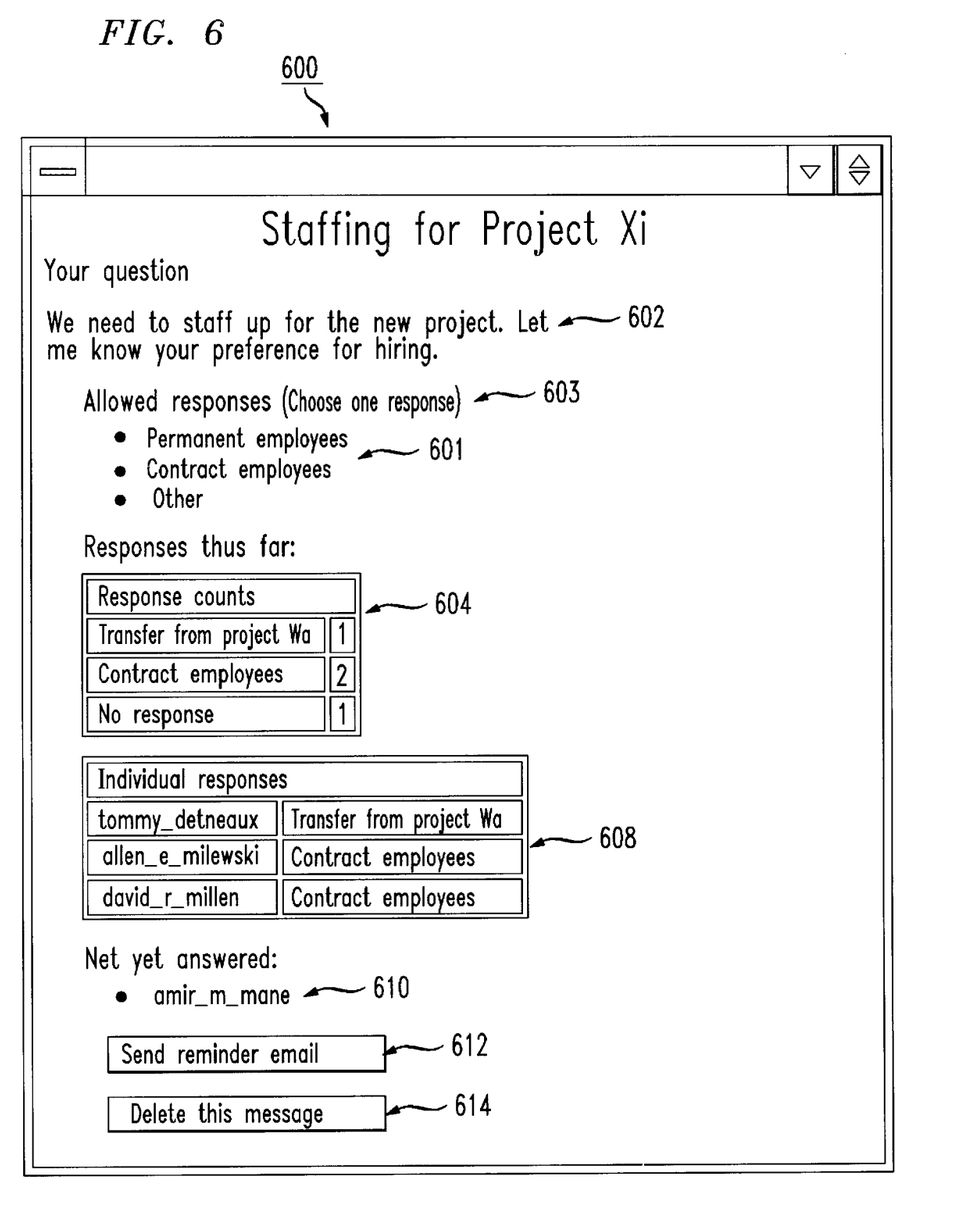
FIG. 6 is a representation of the transaction status in FIG. 2 for the structured object response sent by the recipient(s) to the sender.

FIG. 6 is a screen of a transaction summary form 600 prepared by the controller and indicating the status of the message distributed to the recipients in template 200. A field 602 repeats the text in field 206 of template 200. A field 603 opens or limits responses according to fields 214 or 216 in FIG. 2. A field 604 indicates the allowed responses to the field 206 based upon the authorized responses in field 208 of template 200. A field 606 is a response count and type of response provided by the recipients of the message as listed in field 202 of template 200. The individual responses to the message are listed in a field 606. The controller strips the text from the recipient's response and enters it beside his name in the field 608. A field 610 provides a list of recipients who have not answered the message. A field 612 sends a reminder message to the recipient in field 610 by the sender clicking on the field 612. A field 614 deletes the message from the controller when the sender clicks on the field 614.

Having described the invention from an overview standpoint, a more detailed description will now be described in conjunction with FIGS. 1, 7, 8, 9, and Appendix I.

Figure 7:
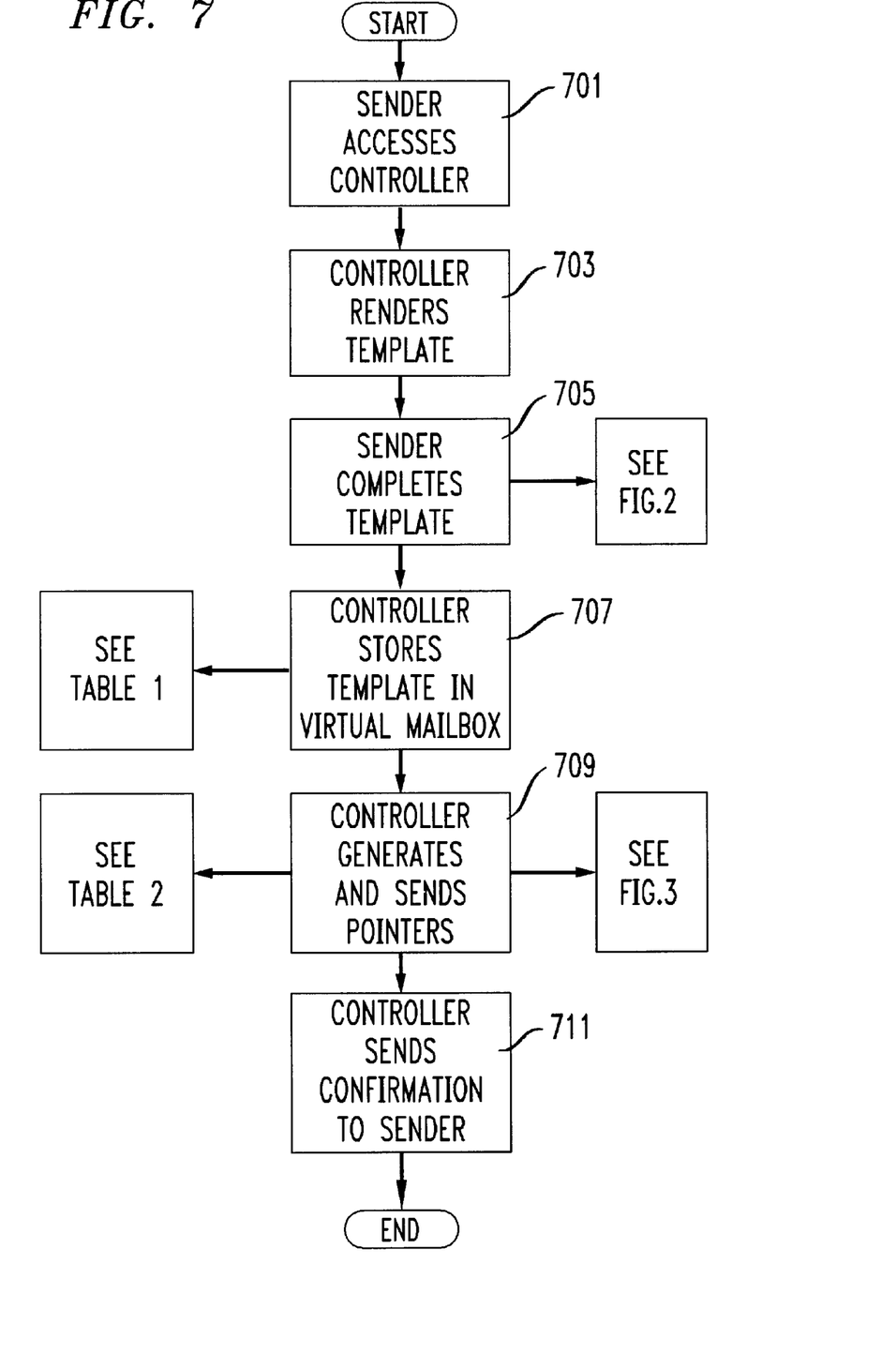
FIG. 7 is a flow diagram for message origination in a transaction between a sender and a controller in the system of FIG. 1.

In FIG. 7, a message transaction is started in an operation 701 in which a sender uses the processor 30 at station 14 to access the controller 12 using conventional stored program instructions in the memory 34 for electronically linking the station 14 and the controller 12. As a part of accessing the controller, the sender identifies a structured object response template, previously prepared by the sender and stored in the controller.

In an operation 703 the controller obtains the selected structured response object from the disk 26 and returns the template to the sender.

In an operation 705, the sender completes the template shown in FIG. 2 using a mouse and/or keyboard and returns the completed template containing the structured object response to the controller for distribution to the addressee.

In an operation 707, the controller stores the template at an address in the memory 22 assigned to sender as a virtual mailbox which is only accessible by the sender or recipients of the action message contained in the template 200. Table 1 is a list of pseudo code executable by the controller in selecting a storage location in the memory as a virtual mailbox for the sender and limiting access to the mailbox to the sender and recipients of the action message.

In an operation 709, the controller sends notification to recipients of the action message in a personalized pointer message to each recipient as shown in FIG. 3. The pointer message directs the recipient to a reply form shown in FIG. 3 which was previously prepared by the sender and stored in the disk 26. Table 2 lists pseudo code executable by the controller in sending the pointer message to the recipient from the disk 22 for storage in the virtual mailbox.

In an operation 711, the controller confirms the dispatch of the pointer message to the recipients and provides the sender with a pointer to status information regarding the content of the virtual mailbox.

Figure 8:
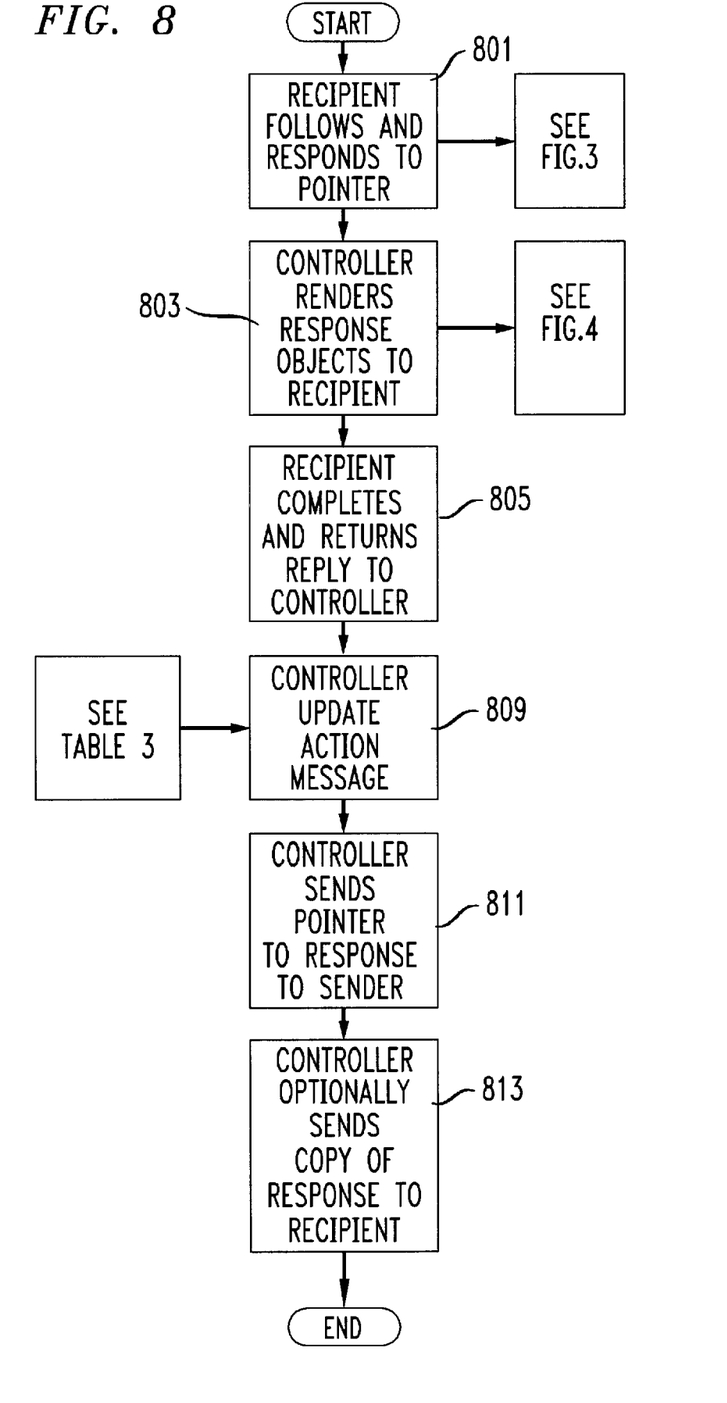
FIG. 8 is a flow diagram of message processing between a sender and a recipient(s) by a controller in the system of FIG. 1

The message transaction origination process is completed at this point and message processing is initiated at the controller as shown in FIG. 8.

In an operation 801, the recipient of the action message accesses the controller using conventional protocols to obtain a listing of messages which have been sent to him/her. Upon viewing the listing of messages on the display 38, the recipient may choose or choose not to reply to an action message listed in his/her mail. In choosing to reply to the action message, the recipient follows the instruction contained in the pointer message (see FIG. 3) to obtain the action message in structured response object form for completion.

In an operation 803, the controller renders the action message body in a reply form shown in FIG. 4 to the recipient using standard World Wide Web protocols and processes (HyperText Transaction Protocols-HTTP; Hypertext Mark Up Language-HTML).

In an operation 805, the recipient completes and returns the reply form to the controller. The controller in an operation 809 updates the action message according to the responses or lack of responses received from the recipients. Optionally, the server updates the message content: either the message body 206 or the structured response objects. Table 4 lists pseudo code executable by the controller for updating the action message according to the responses or lack of responses by the recipients.

In an operation 811, the controller optionally sends notification of recipient responses to the sender. The controller may send notification of every response or may send a notification of only completed transactions.

In an operation 813, the controller optionally sends a recipient a copy of his/her response to the action message. The controller completes processing of the action message at this point and enters into summarizing the transaction as will be described in connection with FIG. 9.

Figure 9:
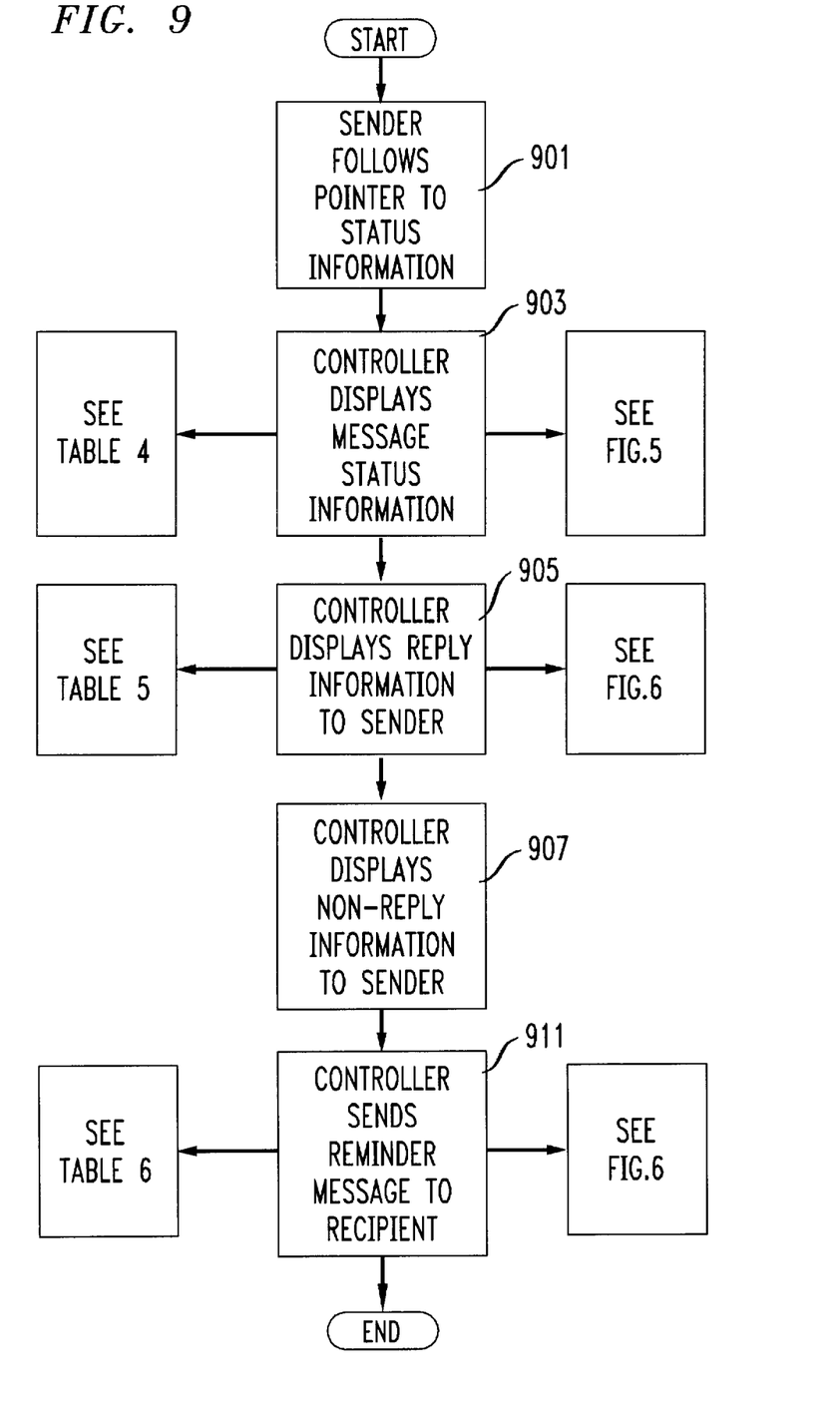
FIG. 9 is a flow diagram for forming a transaction summary of the message processing performed in FIG. 8.

Transaction summarizing is started in operation 901 in which the sender obtains from the controller and follows a pointer to the status information related to the transaction contained at the virtual mailbox. In response to the sender inquiry, the controller in an operation 903 displays the current status (complete or incomplete) of messages sent by the sender and messages sent to the sender as shown in FIG. 5. Table 5 lists pseudo code executable by the controller for summarizing and displaying the status of response or lack of response by recipients upon inquiry by the sender.

In an operation 905, the controller provides the sender upon request with status information as shown in FIG. 6 relative to the reply information received and stored by the controller in the virtual mailbox. The status information may also contain the individual responses from the recipients as indicated in FIG. 6. Table 6 lists pseudo code executable by the controller for summarizing and displaying the status of the responses or lack of responses stored in the virtual mailbox by the controller.

In an operation 907, the controller may also display the list of non-replies to the action message as obtained from field 610 from the status page 600.

In an operation 911, a controller may also generate reminder messages to the recipients based upon the sender's modifications of the status form 600 as shown in FIG. 6. Table 7 lists pseudo code executable by the controller for automatically generating and sending to the recipients a status reminder of an action message when so indicated by the sender. The transaction summary process ends but the summarizing forms shown in FIGS. 5 and 6 are continually updated as new information is obtained from the recipients and collected in the virtual mailbox.

Structured object responses can be arranged to change dynamically as responses are received by the controller. For example, a list of options is made available to addressees. The options are selected by the addressees in the order the addressee responds to the message. A later responding addressee will have the list of available options reduced by the number options selected by earlier responding addressees.

Summarizing, the present invention describes a communication system which automatically supports transactions among system users through 1) structured response objects or action message which simplify tracking, summarizing and reporting transactions to a message initiator and lowering the barrier for a recipient to respond to an action message as a part of the transaction, and 2) a central server containing virtual mailboxes accessible only by the system users involved in a communication transaction.

Appendix 1

Table 1, Controller stores template information in virtual mailbox
MESSAGE ID = generate_unique_id;
open_file MESSAGE_ID for writing;
get SENDER, RECIPIENTS, SUBJECT, QUESTION from composition form;
write (SENDER, RECIPIENTS, SUBJECT, QUESTION) to file MESSAGE_ID;
get NUMBER_OF DESIRED_RESPONSES from composition form;
if (NUMBER_OF_DESIRED_RESPONSES = 1) {
    write ("1") to file MESSAGE_ID;
} else {
    write ("any") to file MESSAGE_ID;
}
get DYNAMIC_CONTENT_REQUIRED? from composition form;
write (DYNAMIC_CONTENT_REQUIRED?) to file MESSAGE_ID;
get all POSSIBLE_RESPONSES from composition form;
for each RESP in (POSSIBLE RESPONSES) {
    write (RESP) to file MESSAGE_ID;
}
get FREEFORM_ALLOWED? from composition form;
write (FREEFORM_ALLOWED?) to file MESSAGE_ID;
close_file MESSAGE_ID;
open_database MESSAGES_SENT for read/write;
    append MESSAGE_ID to SENDER in database MESSAGES_SENT;
close_database MESSAGES_SENT;
open_database MESSAGES_RECEIVED for read/write;
for each RECIP in (RECIPIENTS) {

Appendix 1-continued

```
append MESSAGE_ID to RECIP in database MESSAGES_RECEIVED;
close_database MESSAGES_RECEIVED;
generate_and_send_pointers (MESSAGE_ID);
Table 2, Controller generates and sends pointers
POINTER = generate_pointer_string(MESSAGE_ID);
for each RECIP (RECIPIENTS) {
    open_process MAIL as pipe to mailer;
    write ("To: " & RECIP) to process MAIL;
    write ("Subject: " & SUBJECT) to process MAIL;
    write ("You have an action message from" & SENDER) to process
MAIL;
    THIS_POINTER = personalize_pointer(POINTER, RECIP);
    write ("Please check " & THIS_POINTER) to process MAIL;
    close_process MAIL;
}
Table 3, Controller updates action message
open_file MESSAGE_ID for read/write;
get THIS_RECIPIENT from reply form;
read (RECIPIENTS) from file MESSAGE_ID;
if (THIS_RECIPIENT is not in RECIPIENTS) {
    error ("invalid recipient");
    exit;
}
get CURRENT_RESPONSES from reply form;
read (POSSIBLE_RESPONSES) from file MESSAGE_ID;
for each RESP in (CURRENT_RESPONSES) {
    if (RESP is in POSSIBLE RESPONSES) {
        write (RECIPIENT, RESP) to file MESSAGE_ID;
    } else {
        error ("invalid response");
        exit;
    }
}
read (FREEFORM_ALLOWED?) from file MESSAGE_ID;
if (FREEFORM_ALLOWED?) {
    get FREEFORM_COMMENTS from reply form;
    write (RECIPIENT, FREEFORM_COMMENTS) to file MESSAGE_ID;
}
read (DYNAMIC_CONTENT_REQUIRED?) from file MESSAGE_ID;
if (DYNAMIC_CONTENT_REQUIRED?) {
    QUESTION = modify (QUESTION) by CURRENT_RESPONSES;
    POSSIBLE_RESPONSES = modify (POSSIBLE_RESPONSES)
        by CURRENT_RESPONSES;
    write (QUESTION, RESPONSES) to file MESSAGE_ID;
}
close_file MESSAGE_ID;
Table 4, Controller displays message status info
get INQUIRER from status inquiry form;
open_database MESSAGES_RECEIVED for reading;
MESSAGE_LIST = retrieve INQUIRER from database MESSAGES_RECEIVED;
for each MESSAGE_ID in (MESSAGE_LIST)
    open_file MESSAGE_ID for reading;
    read (SENDER, SUBJECT) from file MESSAGE_ID;
    read (RESPONSES) from file MESSAGE_ID;
    ANSWERED_TEXT = (INQUIRER in RESPONSES) ?
            "ANSWERED": "NOT ANSWERED";
    print (SENDER, SUBJECT, ANSWERED TEXT);
close_file MESSAGE_ID;
}
close_database MESSAGES_RECEIVED;
open_database MESSAGES_SENT for reading;
MESSAGE_LIST = retrieve INQUIRER from database MESSAGES_SENT;
for each MESSAGE_ID in (MESSAGE_LIST) {
    open_file MESSAGE_ID for reading;
    read (SUBJECT) from file MESSAGE_ID;
    read (COMPLETE?) from file MESSAGE_ID;
    COMPLETE_TEXT = COMPLETE? ? "COMPLETE" : "";
    print (SUBJECT, COMPLETE);
    close_file MESSAGE_ID;
}
close_database MESSAGES_RECEIVED;
Table 5, Controller displays reply info to sender
get MESSAGE_ID from inquiry form;
open_file MESSAGE_ID for reading;
read (SUBJECT, QUESTION) from file MESSAGE_ID;
print SUBJECT, QUESTION;
read (POSSIBLE_RESPONSES) from file MESSAGE_ID;
print POSSIBLE_RESPONSES;
read (RECIPIENTS) from file MESSAGE_ID;
```

Appendix 1-continued

```
read (RESPONSES) from file MESSAGE_ID;
RESPONSE_COUNTS = 0;
NOT_RESPONDED = (empty);
RESPONSES = (empty);
for each RECIP (RECIPIENTS) {
    if (RECIP in RESPONSES) {
        THIS_RESP = RESPONSES [RECIP];
        RESPONSE_COUNT[THIS_RESP]++;
    } else {
        append RECIP to NOT_RESPONDED;
    }
}
for each RESP (RESPONSES) {
    print RESP, RESPONSE_COUNT[RESP];
}
for each RECIP (RECIPIENTS) {
    if (RECIP not in NOT_RESPONDED) {
        print RECIP, RESPONSES [RECIP];
    }
}
if (NOT_RESPONDED is not empty) {
    print "Not yet answered:";
    for each RECIP (NOT_RESPONDED) {
        print RECIP;
    }
    insert button (label="Send reminder message",
            action="reminder",
        MESSAGE_ID, NOT_RESPONDED);
}
close_file MESSAGE_ID;
Table 6, Controller sends reminder message to recipient
get (MESSAGE_ID, NOT_RESPONDED) from inquiry form;
open_file (MESSAGE_ID) for reading;
read (SENDER, SUBJECT) from file MESSAGE_ID;
POINTER = generate_pointer_string(MESSAGE_ID);
for each RECIP in (NOT_RESPONDED) {
    open_process MAIL as pipe to mailer;
    write ("To: " & RECIP) to process MAIL;
    write ("Subject: REMINDER: " & SUBJECT) to process MAIL;
    write ("REMINDER: You have an action message from " & SENDER)
to process MAIL;
    THIS_POINTER = personalize pointer (POINTER, RECIP);
    write ("Please check " & THIS_POINTER) to process MAIL;
    close_process MAIL;
}
close_file MESSAGE_ID;
```

While the present invention has been described in a preferred embodiment, various modifications may be made in the embodiment without departing from the spirit and scope of the invention. For example, a structured object response may be delivered by telephone rather than as a part of an electronic messaging system. Accordingly, the present invention should only be limited in terms as defined in the appended claims in which:

We claim:

1. A communication system using structured response objects as action messages and virtual mailboxes in conducting electronic transactions comprising:

a) sender means for forming in a predetermined electronic template an action message identifying at least one receiver for response to the action message in a transaction between a sender and the at least one receiver;

b) processor means for receiving and storing the action message in a virtual mailbox;

c) the processor means further including:

i) means for generating and sending to the at least one receiver an indicator or pointer message in lieu of the action message at the virtual mailbox in the processor means;

ii) means for tracking and recording the response(s) by the at least one receiver to the action message;

iii) means for optionally updating the action message or a message body included therein according to the response(s) or lack of response(s) or an event by the at least one receiver;

iv) means for summarizing and displaying the status of the responses or lack of responses upon inquiry by the sender means;

v) means for automatically generating and sending to the at least one receiver a status reminder of the action message; and d) receiver means for receiving the indicator or pointer and sending a response within the pointer to the action message at the virtual mailbox in the processor means.

2. The communication system of claim 1 wherein the action message is a structured listing of limited possible responses and comments by the at least one receiver to an event described and contained in the action message.

3. The communication system of claim 2 wherein a menu(s) contained in the action message provides choices for the at least one receiver to respond to the action message.

4. The communication system of claim 3 wherein a response is made to the pointer in a graphical user interface by actuating a button or the like for the choice selected by the at least one receiver.

5. The communication system of claim 2 wherein the action message is rendered in a variety of media and using a variety of communication devices.

6. The communication system of claim 1 wherein the processor means is platform independent.

7. The communication system of claim 1 wherein the indicator or pointer message identifies a Uniform Resource Locator for the action message at the processor means.

8. The communication system of claim 1 wherein the sender means includes further means for accessing the action message at the processor means.

9. The communication system of claim 8 wherein the processor means further includes response handling means for summarizing the transaction status of the action message.

10. In a communication system using action messages and virtual mailboxes in electronic transactions, a method of conducting electronic transactions between a sender and at least one receiver comprising the steps of:
 a) forming in an electronic template an action message identifying at least one receiver for response to the action message in the transaction between the sender and the at least one receiver;
 b) receiving and storing the action message in a virtual mailbox contained in a processor means;
 c) generating and sending to the at least one receiver an indicator or pointer message identifying the action message at the virtual mailbox in the processor means;
 d) tracking and recording the response(s) by the at least one receiver to the action message in the processor means;
 e) updating the action message according to the response(s) or lack of response(s) by the at least one receiver in the processor means;
 f) summarizing and displaying the status of the responses or lack of responses upon in the processor means upon inquiry by the sender;
 g) automatically generating and sending to the at least one receiver a status reminder of the action message; and
 h) receiving the indicator or pointer and sending a response in the pointer to the action message at the virtual mailbox in the processor means.

11. An article of manufacturing, comprising:
 a computer usable medium having computer readable program code means embodied therein for performing and controlling electronic messaging in conducting electronic transactions between a sender and at least one receiver using an action message and a virtual mailbox, the computer readable program code means in said article of manufacture comprising:
  a) computer readable program code means for forming in an electronic template an action message identifying at least one receiver for response to the action message in a transaction between the sender and the at least one receiver;
  b) computer readable program code means for receiving and storing the action message in a virtual mailbox contained in a processor means;
  c) computer readable program code means for generating and sending to the sender and the at least one receiver an indicator or pointer message identifying the action message at the virtual mailbox in the processor means;
  d) computer readable program code means for tracking and recording the response(s) by the at least one receiver to the action message in the processor means;
  e) computer readable program code means for updating the action message according to the response(s) or lack of response(s) by the at least one receiver in the processor means;
  f) computer readable program code means for summarizing and displaying the status of the responses or lack of responses in the processor means upon inquiry by the sender;
  g) computer readable program code means for automatically generating and sending to the at least one receiver a status reminder of the action message; and
  h) computer readable program code means for receiving the indicator or pointer and generating and sending in the pointer a response to the action mail at the virtual mailbox in the processor means.

12. An apparatus for conducting electronic transactions between a sender and at least one receiver in a communications system comprising:
 means for incorporating an electronic transaction in an predetermined electronic template as a structured response object;
 processor means for receiving and storing the structured response object in a virtual mailbox; and
 means for providing the at least one receiver with a pointer indicator for response in lieu of the structured response object.

13. The apparatus of claim 12 further comprising means for responding to the structured response object in the pointer indicator by the at least one receiver.

14. The apparatus of claim 12 further comprising means for generating and sending to the at least one receiver means an indicator or pointer message to a receiver identifying the structured response object stored at the virtual mailbox.

15. The apparatus of claim 12 further comprising means for automatically generating and sending a status reminder of the electronic transaction to the sender.

16. The apparatus of claim 12 further comprising means for summarizing and displaying the status of responses or lack of responses to the structured response object.

17. The apparatus of claim 12 further comprising means for tracking and recording responses by the at least one receiver to the structured response object.

18. The apparatus of claim 12 further comprising means for the sender to access the virtual mailbox and view the contents of the structured response object.

19. A method of conducting electronic transactions between a sender and at least one receiver in a communications system comprising the steps of:
 forming a predetermined electronic template including a structured response object for conducting an electronic transaction;
 storing the structured response object in a virtual mailbox in a processor means; and
 providing the at least one receiver with a pointer indicator for response in lieu of the structured response object.

20. The method of claim 19 further comprising the step of providing the predetermined electronic template to a sender for originating an electronic structured response object to the at least one receiver.

21. The method of claim 19 further comprising the step of storing the structured response object in a virtual mailbox.

22. The method of claim 19 further comprising the steps of generating and sending the pointers to receivers listed in the electronic structured response object.

23. The method of claim 19 further comprising the step of forwarding the structured response objects to to the processor means.

24. The method of claim 19 further comprising the steps of generating and forwarding the pointer to the receiver for response to the structured response object.

25. The method of claim 19 further comprising the steps of (a) preparing a menu of choices in the electronic template and forwarding in the pointer to the at least one receiver, and (b) forwarding a copy of the at least one receiver choices in the pointer to the processor by the at least one receiver.

26. The method of claim 19 further comprising the step of displaying message status information for structured response objects forwarded in the pointer to the at least one receiver.

27. The method of claim 19 further comprising the step of displaying non-reply information to a sender for structured response objects in the electronic template forwarded in the pointer to the at least one receiver.

28. The method of claim 19 further comprising the step of sending reminder messages to receivers receiving a structured response object in the pointer.

* * * * *